United States Patent
Fujishiro et al.

(10) Patent No.: US 10,313,886 B2
(45) Date of Patent: Jun. 4, 2019

(54) COMMUNICATION CONTROL METHOD AND BASE STATION

(71) Applicant: KYOCERA CORPORATION, Kyoto (JP)

(72) Inventors: Masato Fujishiro, Yokohama (JP); Hiroyuki Adachi, Kawasaki (JP); Chiharu Yamazaki, Tokyo (JP); Fangwei Tong, Machida (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 38 days.

(21) Appl. No.: 15/127,505

(22) PCT Filed: Mar. 20, 2015

(86) PCT No.: PCT/JP2015/058586
§ 371 (c)(1),
(2) Date: Sep. 20, 2016

(87) PCT Pub. No.: WO2015/141847
PCT Pub. Date: Sep. 24, 2015

(65) Prior Publication Data
US 2017/0127287 A1  May 4, 2017

(30) Foreign Application Priority Data
Mar. 20, 2014  (JP) ................. 2014-059279

(51) Int. Cl.
*H04W 4/70* (2018.01)
*H04W 8/00* (2009.01)
(Continued)

(52) U.S. Cl.
CPC ............ *H04W 16/02* (2013.01); *H04W 4/70* (2018.02); *H04W 8/005* (2013.01); *H04W 48/16* (2013.01);
(Continued)

(58) Field of Classification Search
None
See application file for complete search history.

(56) References Cited

U.S. PATENT DOCUMENTS

2011/0312331 A1* 12/2011 Hakola ............... H04W 72/085
455/452.2
2012/0230260 A1*  9/2012 Virtej ................... H04W 24/02
370/329

(Continued)

FOREIGN PATENT DOCUMENTS

WO  2012/159270 A1  11/2012

OTHER PUBLICATIONS

The extended European search report issued by the European Patent Office dated Sep. 5, 2017, which corresponds to European Patent Application No. 15765129.0-1854 and is related to U.S. Appl. No. 15/127,505.

(Continued)

*Primary Examiner* — Sai Aung
*Assistant Examiner* — Richard Schnell
(74) *Attorney, Agent, or Firm* — Studebaker & Brackett PC

(57) ABSTRACT

A communication control method according to a present embodiment comprises: a step of transmitting, by a first base station, to a third base station that is a neighboring base station of the first base station, a first resource message relating to a first D2D resource used for the D2D proximity service in the first base station. The first resource message includes information on the first D2D resource and a second D2D resource used for the D2D proximity service in a second base station that is a neighboring base station of the first base station.

12 Claims, 6 Drawing Sheets

(51) Int. Cl.
*H04W 16/02* (2009.01)
*H04W 16/04* (2009.01)
*H04W 48/16* (2009.01)
*H04W 72/04* (2009.01)
*H04W 76/14* (2018.01)
*H04W 92/18* (2009.01)
*H04W 92/20* (2009.01)

(52) U.S. Cl.
CPC ....... *H04W 72/04* (2013.01); *H04W 72/0426* (2013.01); *H04W 76/14* (2018.02); *H04W 16/04* (2013.01); *H04W 92/18* (2013.01); *H04W 92/20* (2013.01)

(56) References Cited

U.S. PATENT DOCUMENTS

| | | |
|---|---|---|
| 2013/0072181 A1 | 3/2013 | Hashimoto et al. |
| 2015/0011230 A1* | 1/2015 | Noh ..................... H04W 72/04 455/450 |
| 2015/0223204 A1* | 8/2015 | Cao ........................ H04W 4/06 370/329 |
| 2016/0270014 A1* | 9/2016 | Wang .................... H04W 56/00 |
| 2016/0345307 A1* | 11/2016 | Huang .............. H04W 52/0216 |
| 2017/0048811 A1* | 2/2017 | Seo ..................... H04W 56/002 |

OTHER PUBLICATIONS

Qualcomm Incorporated; Inter-cell Resource Coordination for D2D; 3GPP TSG-RAN WG3 #83; R3-140289; Feb. 10-14, 2014; pp. 1-3; Prague, Czech Republic.

Ericsson; "Synchronization Signals and Channel Design for D2D Discovery and Communication"; 3GPP TSG RAN WG1 Meeting #76; R1-140774; Feb. 10-14, 2014; total 7 pages; Prague, Czech Republic.

International Search Report issued in PCT/JP2015/058586; dated Jun. 9, 2015.

Written Opinion issued in PCT/JP2015/058586; dated Jun. 9, 2015.

3rd Generation Partnership Project; Technical Specification Group RAN; Study on LTE Device to Device Proximity Services—Radio Aspects; 3GPP TR 36.843; V1.0.0; Nov. 2013; pp. 1-32; Release 12; 3GPP Organizational Partners.

* cited by examiner

| D2D Tx Resource pool | | |
|---|---|---|
| >Cell ID | ECGI | Mandatory |
| >> RB | Bitmap | Mandatory |
| >> Subframe | Bitmap | Optional |
| >> ERFCN | ERFCN | Optional |
| >> Hop_count | Integer | Optional |

COMMUNICATION CONTROL METHOD AND BASE STATION

TECHNICAL FIELD

The present invention relates to a communication control method and a base station used in a mobile communication system.

BACKGROUND ART

In 3GPP (3rd Generation Partnership Project) which is a project aiming to standardize a mobile communication system, the introduction of a Device to Device (D2D) proximity service is discussed as a new function in Release 12 and onward (see Non Patent Document 1).

The D2D proximity service (D2D ProSe) is a service enabling direct device-to-device communication within a synchronization cluster including a plurality of synchronized user terminals. The D2D proximity service includes a D2D discovery procedure (Discovery) in which a proximal terminal is discovered, and D2D communication (Communication) that is direct device-to-device communication.

PRIOR ART DOCUMENT

Non-Patent Document

Non Patent Document 1: 3GPP technical report "TR 36.843 V1.0.0" Jan. 16, 2014

SUMMARY OF THE INVENTION

Problem to be Solved by the Invention

In order to enable the use of a D2D proximity service between user terminals that exist in different cells, it is assumed that a base station notifies a neighboring base station of a radio resource used for the D2D proximity service in the base station (hereinafter, called a D2D resource), via an X2 interface.

On the other hand, since it is assumed that a base station does not have a connection, via the X2 interface, with another base station not a neighboring base station, it is preferable to notify the neighboring base station of the D2D resource only to the in order to suppress an increase in overheads.

However, in this case, even if a cell of the base station and a cell of the other base station are geographically close to each other, the other base station is not notified of the D2D resource from the base station, and therefore, it is likely that a user terminal that exists in the cell of the base station is not capable of receiving a D2D radio signal for the D2D proximity service that is transmitted by another user terminal that exists in the cell of the other base station.

Therefore, an object of the present application is to enable a reception of a radio signal for a D2D proximity service between user terminals that are not in the neighborhood but exist in different cells, while suppressing an increase in overheads.

Means of Solving the Problem

A communication control method according to an embodiment is used in a mobile communication system that supports a D2D proximity service including D2D communication that is direct device-to-device communication. The communication control method comprises: a step of transmitting, by a first base station, to a third base station that is a neighboring base station of the first base station, a first resource message relating to a first D2D resource used for the D2D proximity service in the first base station. The first resource message includes information on the first D2D resource and a second D2D resource used for the D2D proximity service in a second base station that is a neighboring base station of the first base station.

A base station according to an embodiment is used in a mobile communication system that supports a D2D proximity service including D2D communication that is direct device-to-device communication. The base station comprises: a transmitter configured to transmit, to a neighboring base station, a first resource message relating to a first D2D resource used for the D2D proximity service in the base station. The first resource message includes information on the first D2D resource and a second D2D resource used for the D2D proximity service in the other neighboring base station.

DESCRIPTION OF THE EMBODIMENT

Overview of Embodiment

Figure 1:
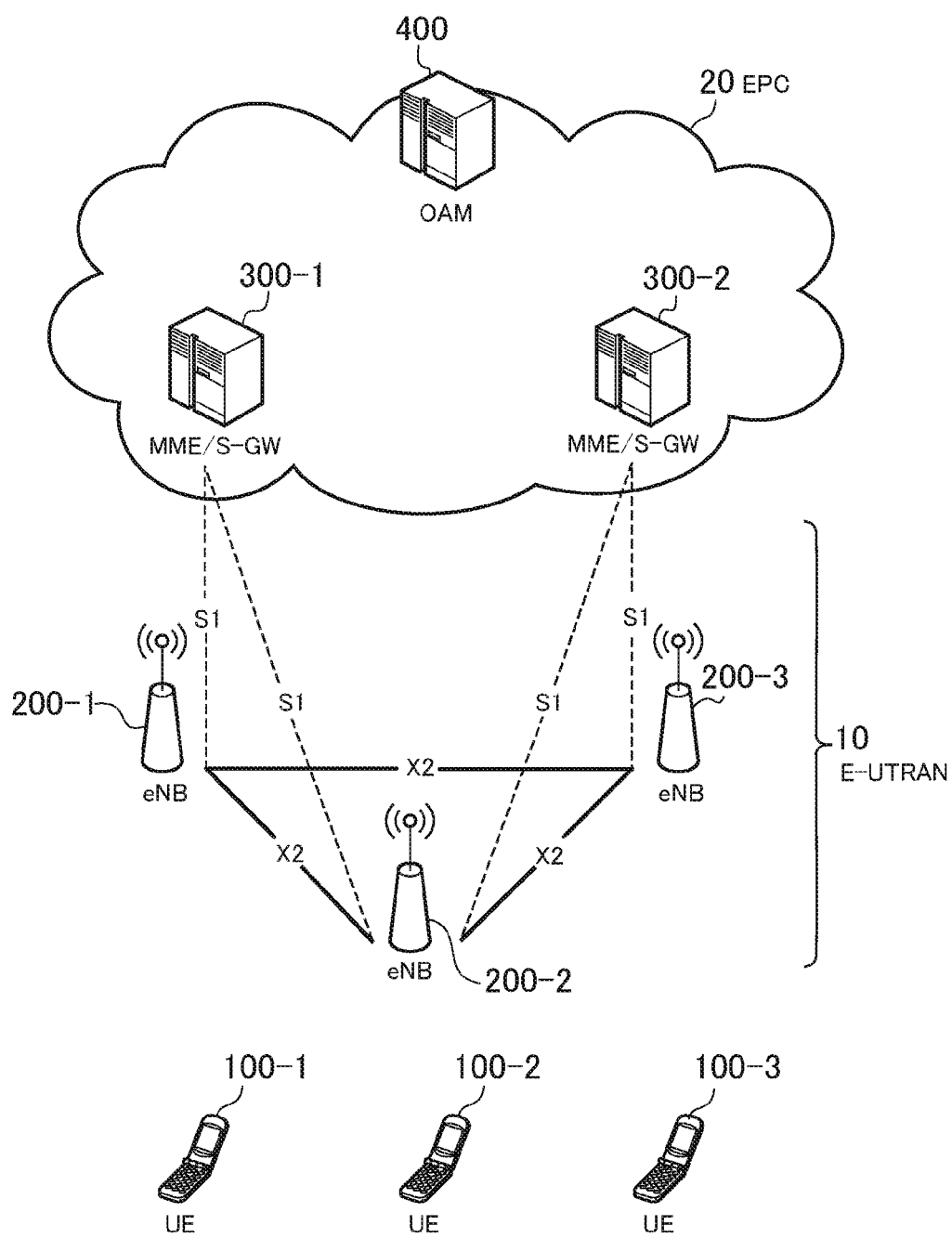
FIG. 1 is a configuration diagram of an LTE system according to an embodiment.

A communication control method according to a first and a second embodiment is used in a mobile communication system that supports a D2D proximity service including D2D communication that is direct device-to-device communication. The communication control method comprises: a step of transmitting, by a first base station, to a third base station that is a neighboring base station of the first base station, a first resource message relating to a first D2D resource used for the D2D proximity service in the first base station. The first resource message includes information on the first D2D resource and a second D2D resource used for the D2D proximity service in a second base station that is a neighboring base station of the first base station.

The communication control method according to the first and the second embodiment further comprises a step of receiving, by the first base station, a second resource message relating to the second D2D resource.

In the first embodiment, in the step of receiving the second resource message, the first base station receives the second resource message including information indicating a second D2D transmission resource available for the transmission of a D2D radio signal in the second base station. The information on the first D2D resource and the second D2D resource is information indicating a first D2D transmission resource available for the transmission of a D2D radio signal in the first base station, and information indicating the second D2D transmission resource.

In the first embodiment, the information on the first D2D resource and the second D2D resource is information indicating a first D2D transmission resource available for the transmission of a D2D radio signal in the first base station, and information indicating a second D2D transmission resource available for the transmission of a D2D radio signal in the second base station. The communication control method further comprises: a step of setting, by the third base station, a new third D2D reception resource by adding a radio resource corresponding to the first D2D transmission resource and the second D2D transmission resource to a third D2D reception resource available for the reception of a D2D radio signal in the third base station, on the basis of the first resource message.

In the first embodiment, in the step of transmitting the first resource message, when the second D2D transmission resource is within a range of the first D2D transmission resource, the first base station transmits the first resource message that includes information indicating the first D2D transmission resource, and does not include information indicating the second D2D transmission resource.

In the first embodiment, the second resource message includes information indicating a second D2D transmission resource available for the transmission of a D2D radio signal in the second base station, and information indicating a fourth D2D transmission resource available for the transmission of a D2D radio signal in a fourth base station that is not a neighboring base station of the first base station but is a neighboring base station of a second base station. In the step of transmitting the first resource message, the first base station transmits the first resource message further including information indicating the fourth D2D transmission resource.

In the first embodiment, in the step of transmitting the first resource message, when the fourth D2D transmission resource is within a range of the second D2D transmission resource, the first base station transmits the first resource message that includes information indicating the second D2D transmission resource, and does not include information indicating the fourth D2D transmission resource.

In the first embodiment, in the step of receiving the second resource message, the first base station receives the second resource message further including information indicating a fifth D2D transmission resource available for the transmission of a D2D radio signal in a fifth base station that is not a neighboring base station of the first base station, in addition to information indicating the second D2D transmission resource. The first resource message includes information indicating the fifth D2D transmission resource in addition to information on the first D2D resource and the second D2D resource. The communication control method further comprises: a step of setting, by the third base station, a new third D2D reception resource by adding a radio resource corresponding to the fifth D2D transmission resource to a third D2D reception resource available for the reception of a D2D radio signal in the third base station, only when a hop count of information indicating the fifth D2D transmission resource is equal to or below an upper-limit value.

In the second embodiment, in the step of receiving the second resource message, the first base station receives the second resource message including information indicating a second D2D reception resource available for the reception of a D2D radio signal in the second base station. The communication control method further comprises: a step of setting, by the first base station, a new first D2D reception resource by adding a radio resource corresponding to the second D2D reception resource to a first D2D reception resource available for the reception of a D2D radio signal in the first base station, on the basis of the second resource message. The information on the first D2D resource and the second D2D resource is information indicating the new first D2D reception resource.

The communication control method according to the second embodiment further comprises: a step of setting, by the third base station, a new third D2D reception resource by adding a radio resource corresponding to the new first D2D reception resource to a third D2D reception resource available for the reception of a D2D radio signal in the third base station, on the basis of the first resource message.

In the second embodiment, in the step of setting the third D2D reception resource, the third base station sets the new third D2D reception resource on the basis of restriction information restricting a range of the third D2D reception resource.

The communication control method according to the second embodiment further comprises: a step of receiving, by the third base station, from a user terminal that exists in a cell of the third base station, a resource report including information on a radio resource with which a D2D radio signal has been successfully received. In the step of setting the new third D2D reception resource, by deleting, from the third D2D reception resource, a radio resource that does not correspond to the radio resource with which a D2D radio signal has been successfully received, on the basis of the resource report, the third base station sets the new third D2D reception resource.

In another embodiment, the information on the first D2D resource and the second D2D resource is information indicating a first D2D transmission resource available for the transmission of a D2D radio signal in the first base station, and information indicating a second D2D reception resource available for the reception of a D2D radio signal in the second base station.

In another embodiment, the information on the first D2D resource and the second D2D resource is information indicating a first D2D reception resource available for the reception of a D2D radio signal in the first base station, and information indicating a second D2D transmission resource available for the transmission of a D2D radio signal in the second base station.

A base station according to the first and the second embodiment is used in a mobile communication system that supports a D2D proximity service including D2D communication that is direct device-to-device communication. The base station comprises: a transmitter configured to transmit, to a neighboring base station, a first resource message relating to a first D2D resource used for the D2D proximity service in the base station. The first resource message includes information on the first D2D resource and a second D2D resource used for the D2D proximity service in the other neighboring base station.

First Embodiment

Hereinafter, a description will be provided for an embodiment when the present invention is applied to an LTE system.

(System Configuration)

FIG. 1 is a configuration diagram of the LTE system according to the embodiment. As illustrated in FIG. 1, the LTE system according to the embodiment includes a plurality of UEs (User Equipments) 100, E-UTRAN (Evolved-UMTS Terrestrial Radio Access Network) 10, and EPC (Evolved Packet Core) 20.

The UE 100 corresponds to the user terminal. The UE 100 is a mobile communication device and performs radio communication with a connected cell (a serving cell). A configuration of the UE 100 will be described later.

The E-UTRAN 10 corresponds to a radio access network. The E-UTRAN 10 includes eNBs 200 (evolved Node-Bs). The eNB 200 corresponds to a base station. The eNB 200 corresponds to the base station. The eNBs 200 are connected mutually via an X2 interface. A configuration of the eNB 200 will be described later.

The eNB 200 manages a cell or a plurality of cells and performs radio communication with UE 100 established a connection with the own cell. The eNB 200, for example, has a radio resource management (RRM) function, a routing function of user data, and a measurement control function for mobility control and scheduling. It is noted that the "cell" is used as a term indicating a minimum unit of a radio communication area, and is also used as a term indicating a function of performing radio communication with the UE 100.

The EPC 20 corresponds to a core network. The E-UTRAN 10 and the EPC 20 constitute a network of the LTE system (LTE network). The EPC 20 includes MMEs (Mobility Management Entities)/S-GWs (Serving-Gateways) 300 and an OAM (Operation and Maintenance) 400.

The MME is a network node for performing various mobility controls, for example, for the UE 100. The S-GW performs transfer control of user data. The MME/S-GW 300 is connected to the eNBs 200 via an S1 interface.

The OAM 400 is a server device managed by an operator and performs maintenance and monitoring of the E-UTRAN 10.

Figure 2:
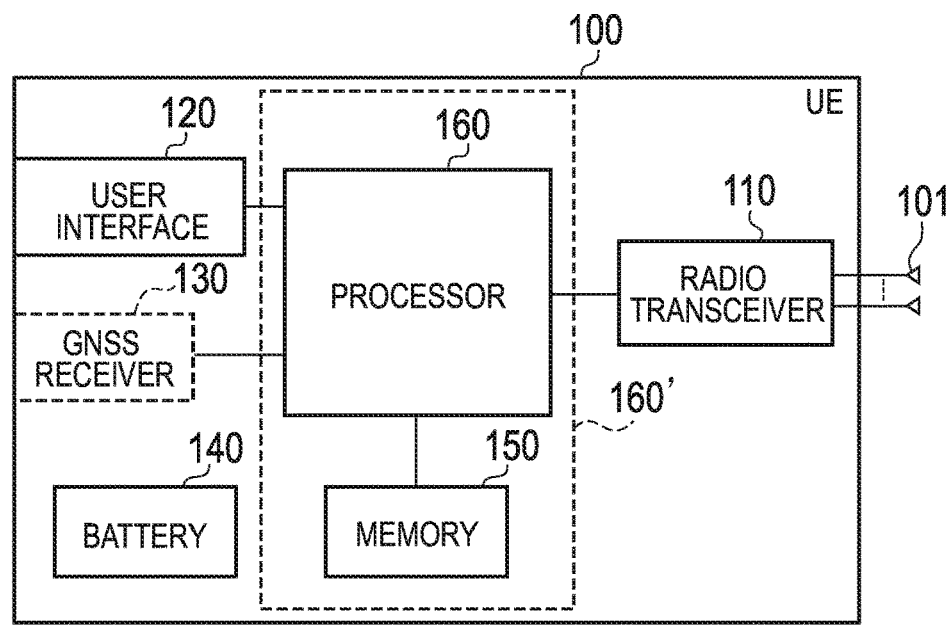
FIG. 2 is a block diagram of a UE according to the embodiment.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The UE 100 may not have the GNSS receiver 130. Furthermore, the memory 150 may be integrally formed with the processor 160, and this set (that is, a chipset) may be called a processor 160'.

The antennas 101 and the radio transceiver 110 are used to transmit and receive a radio signal. The radio transceiver 110 converts a baseband signal (transmission signal) output from the processor 160 into the radio signal, and transmits the radio signal from the antennas 101. Furthermore, the radio transceiver 110 converts the radio signal received by the antennas 101 into the baseband signal (reception signal), and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 corresponds to a controller and implements various processes and various communication protocols described later.

Figure 3:
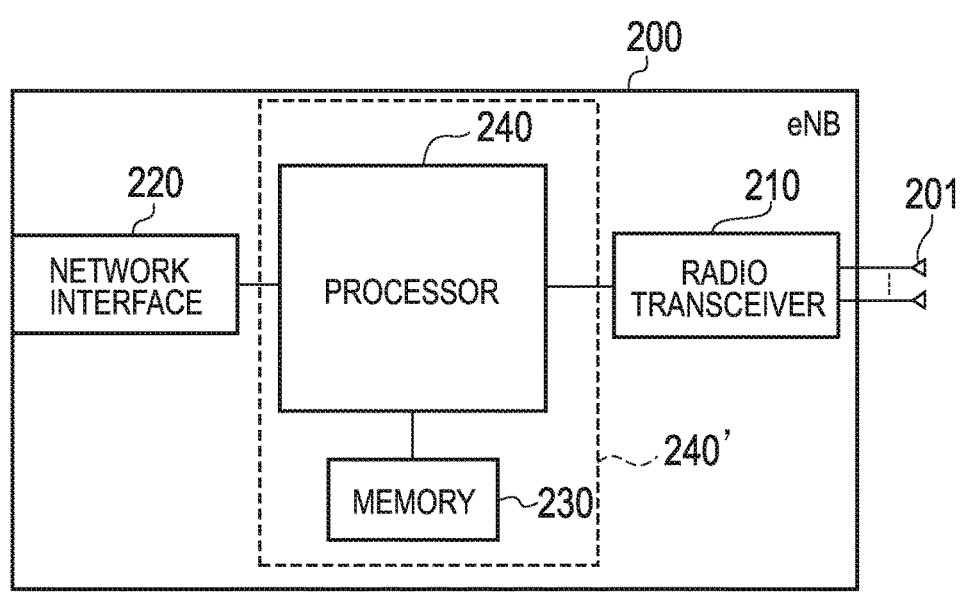
FIG. 3 is a block diagram of an eNB according to the embodiment.

FIG. 3 is a block diagram of the eNB 200. As illustrated in FIG. 3, the eNB 200 includes a plurality of antennas 201, a radio transceiver 210, a network interface 220, a memory 230, and a processor 240. Furthermore, the memory 230 may be integrally formed with the processor 240, and this set (that is, a chipset) may be called a processor 240'.

The antennas 201 and the radio transceiver 210 are used to transmit and receive a radio signal. The radio transceiver 210 converts the baseband signal (transmission signal) output from the processor 240 into the radio signal, and transmits the radio signal from the antennas 201. Furthermore, the radio transceiver 210 converts the radio signal received by the antennas 201 into the baseband signal (reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like of the baseband signal and a CPU that performs various processes by executing the program stored in the memory 230. The processor 240 corresponds to a controller, and implements various processes and various communication protocols described later.

Figure 4:
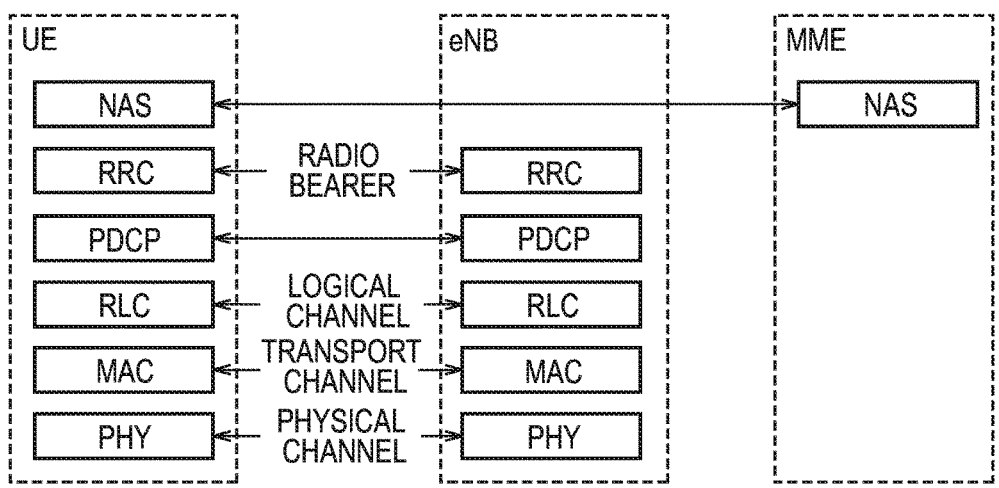
FIG. 4 is a protocol stack diagram according to the embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and control signal are transmitted via the physical channel.

The MAC layer performs preferential control of data, and a retransmission process and the like by hybrid ARQ (HARQ). Between the MAC layer of the UE 100 and the MAC layer of the eNB 200, user data and control signal are transmitted via a transport channel. The MAC layer of the eNB 200 includes a scheduler for determining (scheduling) a transport format (a transport block size, a modulation and coding scheme) of an uplink and a downlink, and an assignment resource block to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When there is a connection (an RRC connection) between the RRC of the UE 100 and the RRC of the eNB 200, the UE 100 is in a RRC connected state and otherwise, the UE 100 is in an RRC idle state.

A NAS (Non-Access Stratum) layer positioned above the RRC layer performs session management or mobility management, for example.

Figure 5:
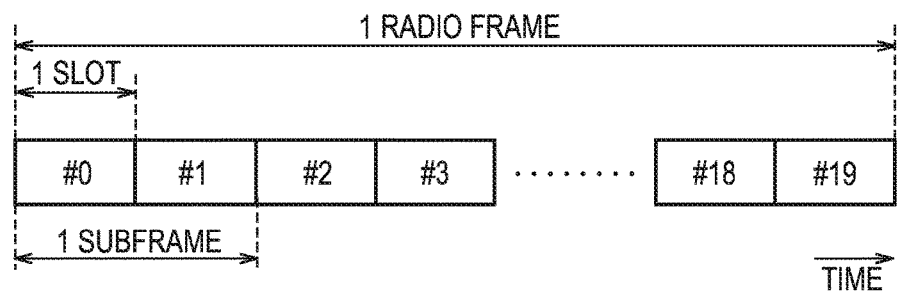
FIG. 5 is a configuration diagram of a radio frame according to the embodiment.

FIG. 5 is a configuration diagram of a radio frame used in the LTE system. In the LTE system, OFDMA (Orthogonal Frequency Division Multiple Access) is applied to a downlink (DL), and SC-FDMA (Single Carrier Frequency Division Multiple Access) is applied to an uplink (UL), respectively.

As illustrated in FIG. 5, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. Among radio resources (time-frequency resources) allocated to the UE 100, a frequency resource can be specified by a resource block and a time resource can be specified by a subframe (or slot).

(D2D Proximity Service)

A D2D proximity service will be described, below. An LTE system according to an embodiment supports the D2D proximity service. The D2D proximity service is described in Non Patent Document 1, and an outline thereof will be described here.

The D2D proximity service (D2D ProSe) is a service enabling direct UE-to-UE communication within a synchronization cluster formed by a plurality of synchronized UEs 100. The D2D proximity service includes a D2D discovery procedure (Discovery) in which a proximal UE is discovered and D2D communication (Communication) that is direct UE-to-UE communication. The D2D communication is also called Direct communication.

A scenario in which all the UEs 100 forming the synchronization cluster are located in a cell coverage is called "In coverage". A scenario in which all the UEs 100 forming the synchronization cluster are located out of a cell coverage is called "Out of coverage". A scenario in which some UEs 100 in the synchronization cluster are located in a cell coverage and the remaining UEs 100 are located out of the cell coverage is called "Partial coverage".

In "In coverage", the eNB 200 is a D2D synchronization source, for example. A D2D asynchronization source is synchronized with the D2D synchronization source without transmitting a D2D synchronization signal. The eNB 200 that is a D2D synchronization source transmits, by a broadcast signal, D2D resource information indicating a radio resource available for the D2D proximity service. The D2D resource information includes information indicating a radio resource available for the D2D discovery procedure (Discovery resource information) and information indicating a radio resource available for the D2D communication (Communication resource information), for example. The UE 100 that is a D2D asynchronization source performs the D2D discovery procedure and the D2D communication on the basis of the D2D resource information received from the eNB 200.

In "Out of coverage" or "Partial coverage", the UE 100 is a D2D synchronization source, for example. In "Out of coverage", the UE 100 that is a D2D synchronization source transmits D2D resource information indicating a radio resource available for the D2D proximity service, by a D2D synchronization signal, for example. The D2D synchronization signal is a signal transmitted in a D2D synchronization procedure in which device-to-device synchronization is established. The D2D synchronization signal includes a D2DSS and a physical D2D synchronization channel (PD2DSCH). The D2DSS is a signal for providing a synchronization standard of a time and a frequency. The PD2DSCH is a physical channel through which more information is conveyed than the D2DSS. The PD2DSCH conveys the above-described D2D resource information (Discovery resource information, Communication resource information). Alternatively, if the D2DSS is associated with the D2D resource information, the PD2DSCH may be rendered unnecessary.

The D2D discovery procedure is used mainly if the D2D communication is performed by unicast. One UE 100 uses any particular radio resource out of radio resources available for the D2D discovery procedure if starting the D2D communication with another UE 100 to transmit the Discovery signal (D2D discovery signal). The other UE 100 scans the Discovery signal within the radio resource available for the D2D discovery procedure if starting the D2D communication with the one UE 100 to receive the Discovery signal. The Discovery signal may include information indicating a radio resource used by the one UE 100 for the D2D communication.

Operation According to First Embodiment

Figure 6:
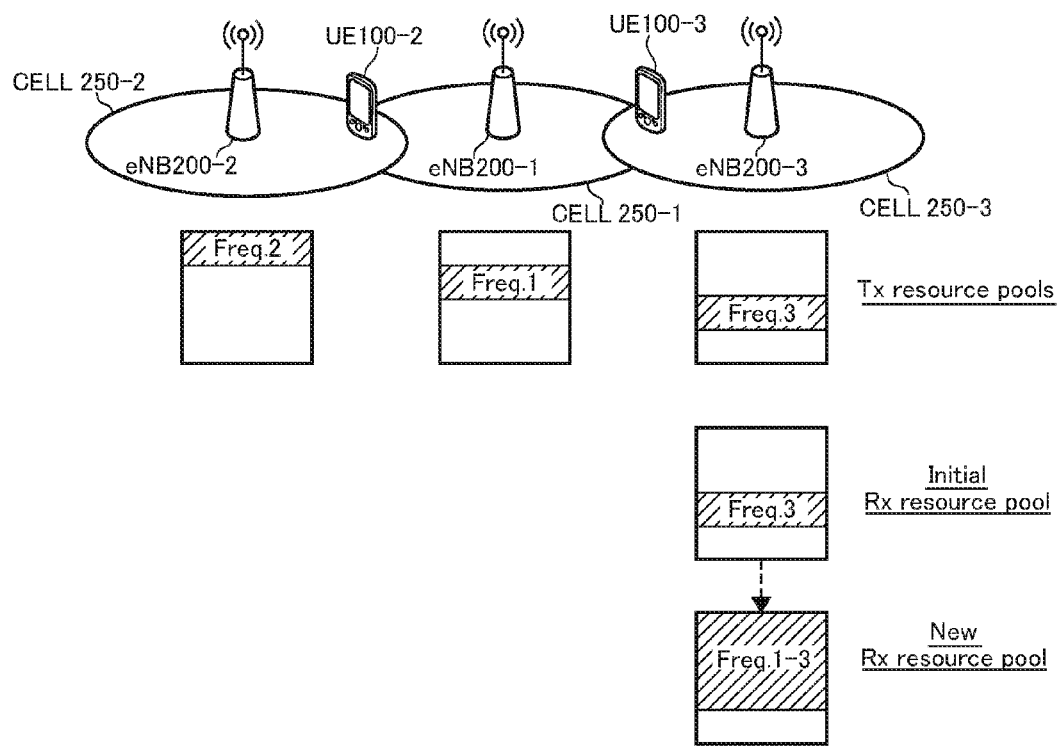
FIG. 6 is a diagram for describing an operation according to a first embodiment.
Figures 7, 8:
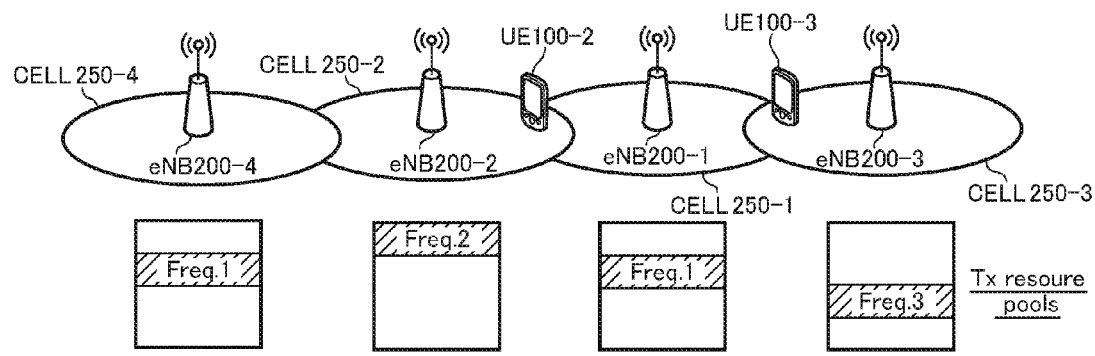
FIG. 7 is a diagram for describing an example of D2D resource information according to the first embodiment.
FIG. 8 is a diagram for describing an operation according to a modification of the first embodiment.

Hereinafter, an operation according to the first embodiment will be described by using FIG. 6 to FIG. 8. FIG. 6 is a diagram for describing an operation according to the first embodiment. FIG. 7 is a diagram for describing an example of D2D resource information according to the first embodiment.

(A) Operation Environment

As shown in FIG. 6, the mobile communication system according to the first embodiment has an eNB 200-1, an eNB 200-2, an eNB 200-3, a UE 100-2, and a UE 100-3.

The eNB 200-1 is a neighboring base station of the eNB 200-2 and the eNB 200-3. Therefore, a cell 250-1 managed by the eNB 200-1 is in a neighborhood of each of a cell 250-2 managed by the eNB 200-2 and a cell 250-3 managed by the eNB 200-3. The eNB 200-1 is capable of performing communication with each of the eNB 200-2 and the eNB 200-3 via an X2 interface.

The eNB 200-1 sets a D2D resource used for the D2D proximity service in the eNB 200-1 (that is, the cell 250-1). Here, the D2D resource used for the D2D proximity service is a D2D transmission resource pool (a Tx resource pool), which is a radio resource available for the transmission of a D2D radio signal, and a D2D reception resource pool (an Rx resource pool), which is a radio resource available for the reception of a D2D radio signal. In the present embodiment, the eNB 200-1 sets a radio resource of a frequency band #1 (Freq. 1) to the D2D transmission resource pool (see FIG. 6). In order to enable the exchange of the D2D radio signal between UEs of the cell of the eNB 200-1, the eNB 200-1 sets a radio resource including a radio resource of the frequency band #1 to the D2D reception resource pool.

The eNB 200-1 notifies, of the information on the set D2D resource, the UE (not shown in the figure) that exists in the cell 250-1 by broadcast (or by unicast), as the D2D resource information. The UE that exists in the cell 250-1 exchanges the D2D radio signal on the basis of the notified D2D resource. In the present embodiment, the UE transmits the D2D radio signal by using the radio resource of the frequency band #1.

It is noted that the D2D radio signal is a radio signal that is used for the D2D proximity service. The D2D radio signal includes a discovery signal transmitted in a D2D discovery procedure (Discovery), a D2D communication signal transmitted in a D2D communication (Communication), a D2D synchronization signal transmitted in a D2D synchronization procedure, and a control signal including a scheduling assignment (an SA) indicating a location of a radio resource for receiving user data in the D2D communication.

In the present embodiment, the D2D resource used for the D2D proximity service is a radio resource (for example, a discovery transmission resource pool) available for the transmission of at least any of the above-described D2D radio signals (for example, a discovery signal), and a radio resource (for example, a discovery reception resource pool) available for the reception of at least any of the above-described D2D radio signals (for example, a discovery signal).

The eNB 200-2 is a neighboring base station of the eNB 200-1, but is not a neighboring base station of the eNB 200-3. Therefore, the cell 250-2 is in the neighborhood of the cell 250-1, but is not in the neighborhood of the cell 250-3. On the other hand, the cell 250-2 is located close to the cell 250-3. Specifically, the cell 250-2 is in a range in which the D2D radio signal from the UE 100-2 that exists in the cell 250-2 reaches the UE 100-3 that exists in on the cell 250-3. The eNB 200-2 is capable of performing communication with the eNB 200-1 via the X2 interface, but is not capable of performing communication with the eNB 200-3 via the X2 interface.

The eNB 200-2 sets a D2D resource used for the D2D proximity service in the eNB 200-2 (that is, the cell 250-2). In the present embodiment, the eNB 200-2 sets a radio resource of a frequency band #2 (Freq. 2) to the D2D transmission resource pool (see FIG. 6). The frequency band #2 is a radio resource different from the frequency band #1. In order to enable the exchange of the D2D radio signal between UEs of the cell of the eNB 200-2, the eNB 200-2 sets a radio resource including a radio resource of the frequency band #2 to the D2D reception resource pool.

Similarly to the eNB 200-1, the eNB 200-2 notifies the UE 100-2 of the information on the set D2D resource. In the present embodiment, the UE 100-2 transmits the D2D radio signal by using the radio resource of the frequency band #2.

The eNB 200-3 is a neighboring base station of the eNB 200-1, but is not a neighboring base station of the eNB 200-2. Therefore, the cell 250-3 is in the neighborhood of the cell 250-1, but is not in the neighborhood of the cell 250-2. In addition, the eNB 200-3 is capable of performing communication with the eNB 200-1 via the X2 interface, but is not capable of performing communication with the eNB 200-2 via the X2 interface.

The eNB 200-3 sets a D2D resource used for the D2D proximity service in the eNB 200-3 (that is, the cell 250-3). In the present embodiment, the eNB 200-3 sets a radio resource of a frequency band #3 (Freq. 3) to the D2D transmission resource pool (see FIG. 6). The frequency band #3 is a radio resource different from the frequency band #1 and the frequency band #2. In order to enable the exchange of the D2D radio signal between UEs of the cell of the eNB 200-3, the eNB 200-3 sets a radio resource including a radio resource of the frequency band #3 to the D2D reception resource pool. In the present embodiment, the D2D reception resource pool (Initial Rx resource pool) set to the eNB 200-3 is a radio resource of the frequency band #3.

Similarly to the eNB 200-1, the eNB 200-3 notifies the UE 100-3 of the information on the set D2D resource. In the present embodiment, the UE 100-3 transmits the D2D radio signal by using the radio resource of the frequency band #3.

The UE 100-2 exists in the cell 250-2. For example, the UE 100-2 is in an RRC idle state in the cell 250-2. Alternatively, the UE 100-2 may be in an RRC connected state in the cell 250-2.

The UE 100-3 exists in the cell 250-3. For example, the UE 100-3 is in an RRC idle state in the cell 250-3. Alternatively, the UE 100-3 may be in an RRC connected state in the cell 250-3.

In the present embodiment, the UE 100-2 is located at a cell terminal at the side of the cell 250-3, and the UE 100-3 is located at a cell terminal at the side of the cell 250-2. The description proceeds on the assumption that the D2D radio signal from the UE 100-2 reaches the UE 100-3.

In such an operating environment, the following operation is performed.

(B) Operation Overview

First of all, the eNB 200-2 transmits, to the eNB 200-1, a second D2D resource message relating to a D2D resource set in the eNB 200-2 via the X2 interface. The eNB 200-1 receives the second D2D resource message from the eNB 200-2.

In the present embodiment, the second D2D resource message includes information on the D2D transmission resource pool (the second D2D transmission resource information) that is set in the eNB 200-2. As shown in FIG. 7, the second D2D transmission resource information may include the information described below.

Cell identifier (Cell ID)
Resource block (RB)
Subframe
ERFCN
Hop count (Hop_count)

Here, a cell identifier is associated with information indicating the D2D transmission resource pool in the cell indicated by the cell identifier (specifically, the cell 250-2). The information indicating the D2D transmission resource pool includes a resource block, a subframe, and an ERFCN (E-UTRA ARFCN).

The resource block is a resource block indicating a D2D transmission resource pool. In the present embodiment, the resource block is a resource block of the frequency band #2. The subframe is a subframe indicating a D2D transmission resource pool. The ERFCN is identification information of a frequency indicating the D2D transmission resource pool. In the present embodiment, the ERFCN indicates the frequency band #2.

The hop count indicates the frequency of transfer of the information indicating the D2D transmission resource pool. Here, the hop count is 0.

Next, the eNB 200-1 transmits, to the eNB 200-3, a first D2D resource message relating to a D2D resource set in the eNB 200-1 via the X2 interface. The eNB 200-3 receives the first D2D resource message from the eNB 200-1.

The first D2D resource message includes information on the D2D transmission resource pool (the first D2D transmission resource information) that is set in the eNB 200-1. The first D2D transmission resource information is information similar to the second D2D transmission resource information described above. In the present embodiment, the first D2D transmission resource information includes information on the cell identifier indicating the cell 250-1, the resource block of the frequency band #1, the subframe indicating the D2D transmission resource pool in the eNB 200-1, the ERFCN indicating the frequency band #1, and the hop count indicating that the transfer frequency of the D2D transmission resource pool in the eNB 200-1 is 0.

Here, the first D2D resource message includes second D2D transmission resource information in addition to the first D2D transmission resource information. Therefore, the first D2D resource message includes information on the D2D transmission resource pool in the eNB 200-1 and the D2D transmission resource pool in the eNB 200-2.

It is noted that the second D2D transmission resource information included in the first D2D resource message is information similar to the second D2D transmission resource information included in the second D2D resource message. However, the hop count included in the second D2D transmission resource information indicates 1.

When the D2D transmission resource pool in the eNB 200-2 is within the range of the D2D transmission resource pool in the eNB 200-1, the eNB 200-1 may transmit the first D2D resource message that does not include the second D2D transmission resource information. In the present embodiment, since the D2D transmission resource pool (the frequency band #1) in the eNB 200-1 and the D2D transmission resource pool (the frequency band #2) in the eNB 200-2 are different, the eNB 200-1 transmits the first D2D resource message including the second D2D transmission resource information.

The eNB 200-3 configured to receive the first D2D resource message sets the D2D reception resource pool in the eNB 200-3 (that is, the cell 250-3) on the basis of the first D2D resource message. Specifically, the eNB 200-3 adds a radio resource corresponding to the D2D transmission resource pool in the eNB 200-1 and the D2D transmission resource pool in the eNB 200-2 to the D2D reception resource pool in the eNB 200-3. That is, the eNB 200-3 adds the radio resources of the frequency bands #1 and #2 to the D2D reception resource pool. Therefore, the eNB 200-3 sets the radio resources of the frequency bands #1 to #3 as a new D2D reception resource pool.

The eNB 200-3 transmits (gives a notification of), as the D2D resource information, a new D2D reception resource pool to the UE 100-3. The UE 100-3 sets a radio resource (the frequency bands #1 to #3) available for the reception of the D2D radio signal on the basis of the new D2D reception resource pool. Therefore, even when the UE 100-2 transmits the D2D radio signal by using a radio resource included in the frequency band #2, which is the D2D transmission resource pool in the eNB 200-2 (the cell 250-2), the UE 100-3 is capable of receiving the D2D radio signal from the UE 100-2 by performing a scan for the set frequency bands #1 to #3.

(C) Modification

Next, a modification of the operation described above will be described by using FIG. 8. FIG. 8 is a diagram for describing an operation according to a modification of the first embodiment. It is noted that a description will be provided while focusing on a portion different from the above-described operation, and a description of a similar portion will be omitted, where necessary.

In the above-described operation, the second D2D resource message includes the second D2D transmission resource information, but in the present modification, the second D2D resource message includes the information on the D2D transmission resource pool set in a neighboring eNB of the eNB 200-2 that is different from the eNB 200-1 (specifically, the eNB 200-4), in addition to the second D2D transmission resource information.

As shown in FIG. 8, the eNB 200-4 is a neighboring base station of the eNB 200-2, but is not a neighboring base station of the eNB 200-1. Therefore, the cell 250-4 managed by the eNB 200-4 is in the neighborhood of the cell 250-2, but is not in the neighborhood of the cell 250-1. On the other hand, the cell 250-4 is located close to the cell 250-1. Specifically, the cell 250-4 is in a range in which the D2D radio signal from the UE that exists in the cell 250-4 reaches the UE that exists in the cell 250-1. The eNB 200-4 is capable of performing communication with the eNB 200-2 via the X2 interface, but is not capable of performing communication with the eNB 200-1 via the X2 interface.

The eNB 200-4 sets a D2D resource used for the D2D proximity service in the eNB 200-4 (that is, the cell 250-4). In the modification, the eNB 200-4 sets a radio resource of a frequency band #1 (Freq. 1) to the D2D transmission resource pool (see FIG. 8). In order to enable the exchange of the D2D radio signal between UEs of the cell of the eNB 200-4, the eNB 200-4 sets a radio resource including a radio resource of the frequency band #1 to the D2D reception resource pool.

First of all, the eNB 200-4 transmits, to the eNB 200-2, a fourth D2D resource message relating to a D2D resource set in the eNB 200-4 via the X2 interface. The eNB 200-2 receives the second D2D resource message from the eNB 200-4.

As in the above, the fourth D2D resource message includes information on the D2D transmission resource pool (the fourth D2D transmission resource information) that is set in the eNB 200-4.

It is noted that similarly to the first D2D resource message described above, the fourth D2D resource message may include the information on the D2D transmission resource pool (the fifth D2D transmission resource information) set in an eNB 200-5 that is not a neighboring eNB of the eNB 200-4, in addition to the fourth D2D transmission resource information.

Next, the eNB 200-2 transmits the second D2D resource message to the eNB 200-1. The second D2D resource message further includes the fourth D2D transmission resource information in addition to the second D2D transmission resource information. The second D2D resource message may further include the fifth D2D transmission resource information.

Next, the eNB 200-1 transmits the first D2D resource message to the eNB 200-3. The eNB 200-1 is capable of transmitting, to the eNB 200-3, the first D2D resource message including the fourth D2D transmission resource information that is included in the received second D2A resource message. Alternatively, when the D2D transmission resource pool in the eNB 200-4 is within the range of the D2D transmission resource pool in the eNB 200-2, the eNB 200-1 may transmit the first D2D resource message that includes the second D2D transmission resource information and does not include the fourth D2D transmission resource information. Else, when the D2D transmission resource pool in the eNB 200-4 is within the range of the D2D transmission resource pool in the eNB 200-1, the eNB 200-1 may transmit the first D2D transmission resource information that does not include the fourth D2D transmission resource information. In the present modification, since the D2D transmission resource pool in the eNB 200-1 and the D2D transmission resource pool in the eNB 200-4 are the same in the frequency band #1, the eNB 200-1 is capable of transmitting the first D2D transmission resource information that does not include the fourth D2D transmission resource information.

Further, when the second D2D transmission message includes the fifth D2D transmission resource information, then as described above, the first D2D resource message may either include or not include the fifth D2D transmission resource information. The eNB 200-1 may transmit the first D2D resource message including the fifth D2D transmission resource information only when the hop count included in the fifth D2D transmission resource information is equal to or below the upper-limit value (a first threshold value). The first threshold value may be set beforehand in the eNB 200-1. Alternatively, the eNB 200-1 may receive information indicating the first threshold value from the OAM.

As described above, the eNB 200-3 configured to receive the first D2D resource message sets the D2D reception resource pool in the eNB 200-3 on the basis of the first D2D resource message. In the present modification, when the first D2D resource message includes the fourth D2D transmission resource information, the eNB 200-3 is capable of adding not only a radio resource corresponding to the D2D transmission resource pool in the eNB 200-1 and the D2D transmission resource pool in the eNB 200-2, but also a radio resource corresponding to the D2D transmission resource pool in the eNB 200-4, to the D2D reception resource pool in the eNB 200-3.

Further, when the first D2D resource message includes the fifth D2D transmission resource information, the eNB 200-3 may add the radio resource corresponding to the D2D transmission resource pool in the eNB 200-5 to the D2D reception resource pool in the eNB 200-3 only when the hop count included in the fifth D2D transmission resource information is equal to or below the upper-limit value (a second threshold value). The second threshold value may be set beforehand in the eNB 200-3. Alternatively, the eNB 200-3 may receive information indicating the second threshold value from the OAM. The second threshold value may be the same value as the first threshold value described above, or may be a value lower than the first threshold value.

Summary of First Embodiment

In the present embodiment, the eNB 200-1 receives the second D2D resource message from the eNB 200-2. The eNB 200-1 configured to receive the second D2D resource message transmits the first D2D resource message to the eNB 200-3. The first D2D resource message includes the information on the D2D resource used for the D2D proximity service in the eNB 200-1, and the D2D resource used for the D2D proximity service in the eNB 200-2. As a result, the eNB 200-3 is capable of receiving the information on the D2D resource used for the D2D proximity service in the eNB 200-2 that is not a neighboring eNB 200 of the eNB 200-3, via the X2 interface. Therefore, since the eNB 200-3 is capable of setting the D2D resource in the eNB 200-3 on the basis of the information on the D2D resource set in the eNB 200-2, it is possible to receive a D2D radio signal between the eNB 200-2 and the eNB 200-3, while suppressing an increase in the overheads.

In the present embodiment, the eNB 200-1 receives the second D2D resource message including the second D2D transmission resource information. The first D2D resource message includes the first D2D transmission resource information, which is the information on the D2D transmission resource pool that is set in the eNB 200-1, and the second D2D transmission resource information, which is the information on the D2D transmission resource pool that is set in the eNB 200-2. In addition, in the present embodiment, by adding a radio resource corresponding to the D2D transmission resource pool in the eNB 200-1 and the D2D transmission resource pool in the eNB 200-2 to the D2D reception resource pool in the eNB 200-3, the eNB 200-3 sets a new D2D reception resource pool. As a result, the UE 100-3 that exists in the cell 250-3 is capable of receiving a D2D radio signal not only from the UE that exists in the cell 250-1 that is a neighboring cell, but also the UE 100-2 that exists in the cell 250-2.

In the present embodiment, when the D2D transmission resource pool in the eNB 200-2 is within the range of the D2D transmission resource pool in the eNB 200-1, the eNB 200-1 is capable of transmitting the first D2D resource message that does not include the second D2D transmission resource information. As a result, the eNB 200-1 is capable of deleting the information included in the first D2D resource message while retaining the information that enables the UE 100-3 to receive the D2D radio signal from the UE 100-2.

In the present embodiment, the eNB 200-1 is capable of transmitting, to the eNB 200-3, the first D2D resource message that further includes the information on the fourth D2D transmission resource pool. As a result, the UE 100-3 that exists in the cell 250-3 is capable of receiving a D2D radio signal from the UE that exists in the cell 250-4 managed by the eNB 200-4.

In the present embodiment, when the D2D transmission resource pool in the eNB 200-4 is within the range of the D2D transmission resource pool in the eNB 200-2, the eNB 200-1 is capable of transmitting the first D2D resource message that does not include the fourth D2D transmission resource information. As a result, the eNB 200-1 is capable of deleting the information included in the first D2D resource message while retaining the information that enables the UE 100-3 to receive the D2D radio signal from the UE 100-2.

In the present embodiment, by adding the radio resource corresponding to the D2D transmission resource pool in the eNB 200-5 to the D2D reception resource pool in the eNB 200-3 only when the hop count included in the fifth D2D transmission resource information is equal to or below the upper-limit value (the second threshold value), the eNB 200-3 is capable of setting a new D2D reception resource pool. This enables the eNB 200-3 to suppress addition of a radio resource corresponding to the D2D transmission resource pool in the eNB 200-5 that is located at a geographically far location from the eNB 200-3, to the D2D reception resource pool in the eNB 200-3.

Second Embodiment

Figure 9:
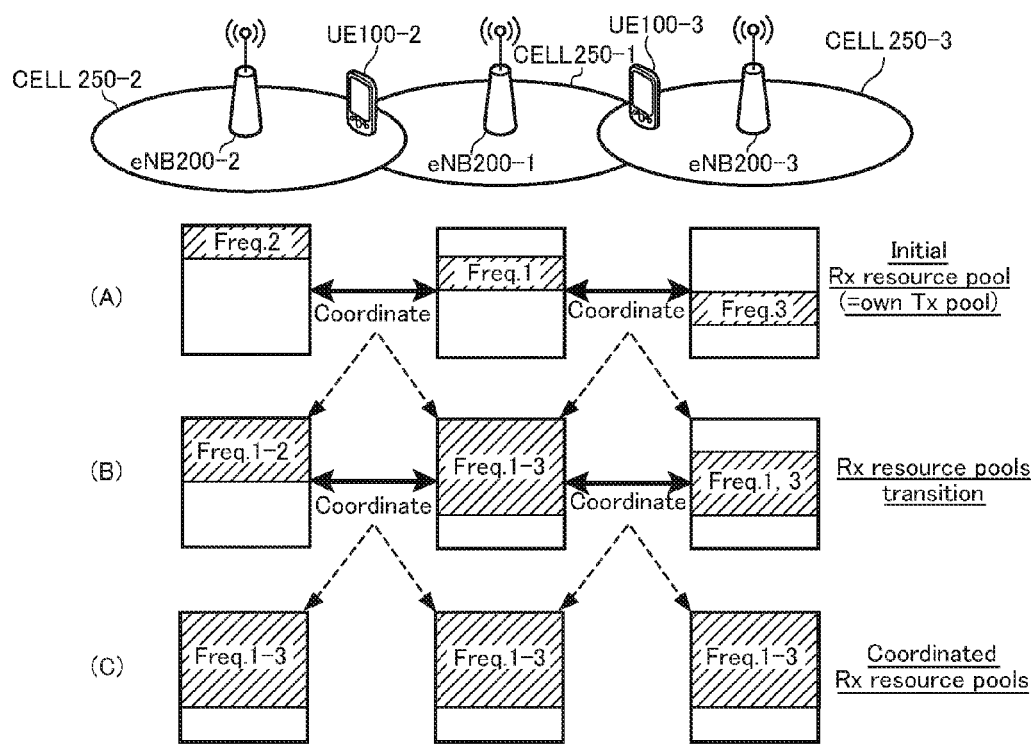
FIG. 9 is an explanatory diagram for describing an operation according to a second embodiment.

Next, an operation according to a second embodiment will be described by using FIG. 9. FIG. 9 is an explanatory diagram for describing an operation according to the second embodiment. It is noted that a description will be provided while focusing on a portion different from the above-described first embodiment, and a description of a similar portion will be omitted, where necessary.

In the first embodiment, each D2D resource message includes the information on a D2D transmission resource pool, but in the second embodiment, each D2D resource message includes the information on a D2D reception resource pool.

It is noted that in the second embodiment, the description proceeds on the assumption that the D2D reception resource pool and the D2D transmission resource pool set in each eNB 200 are the same radio resources.

As shown in FIG. 9(A), coordination of the D2D resources is performed among the eNBs 200.

Specifically, first of all, the eNB 200-1 transmits the first D2D resource message to the eNB 200-2 and the eNB 200-3. Each of the eNB 200-2 and the eNB 200-3 receives the first D2D resource message. The eNB 200-2 transmits the second D2D resource message to the eNB 200-1. The eNB 200-1 receives the second D2D resource message. The eNB 200-3 transmits the third D2D resource message to the eNB 200-1. The eNB 200-1 receives the third D2D resource message.

The first D2D resource message includes information on the D2D reception resource pool (the first D2D reception resource information) that is set in the eNB 200-1. Similarly to each D2D transmission resource information according to the first embodiment, the first D2D reception resource information is capable of including the information described below, for example.

Cell identifier (Cell ID)
Resource block (RB)
Subframe
ERFCN

Here, a cell identifier is associated with information indicating the D2D reception resource pool in the cell indicated by the cell identifier (specifically, the cell 250-1). The information indicating the D2D reception resource pool includes a resource block, a subframe, and an ERFCN (E-UTRA ARFCN).

The resource block is a resource block indicating a D2D reception resource pool. In the present embodiment, the resource block is a resource block of the frequency band #1. The subframe is a subframe indicating a D2D reception resource pool. The ERFCN is identification information of a frequency indicating the D2D reception resource pool. In the present embodiment, the ERFCN indicates the frequency band #1. It is noted that the first D2D reception resource information does not include the information on the hop count.

Similarly to the first D2D resource message, the second D2D resource message includes information on the D2D reception resource pool (the second D2D reception resource information) that is set in the eNB 200-2. Therefore, the second D2D reception resource information includes the information on the frequency band #2 that is set as the D2D reception resource pool in the eNB 200-2.

Similarly to the first D2D resource message, the third D2D resource message includes information on the D2D reception resource pool (the third D2D reception resource information) that is set in the eNB 200-3. Therefore, the third D2D reception resource information includes the information on the frequency band #3 that is set as the D2D reception resource pool in the eNB 200-3.

As described above, the eNB 200-1 and the eNB 200-2 exchange the set D2D resource information. The eNB 200-1 and the eNB 200-3 exchange the set D2D resource information.

The eNB 200-1 sets a new first D2D reception resource pool on the basis of the second and the third D2D resource messages. Specifically, the eNB 200-1 adds a radio resource corresponding to the D2D reception resource pool set in the eNB 200-2 and the D2D reception resource pool set in the eNB 200-3 to the D2D reception resource pool in the eNB 200-1. Therefore, the eNB 200-1 adds the radio resources of the frequency bands #2 and #3 to the D2D reception resource pool of the eNB 200-1. As a result, the eNB 200-1 sets the radio resources of the frequency bands #1 to #3 as a new D2D reception resource pool (see FIG. 9(B)).

The eNB 200-2 sets a new second D2D reception resource pool on the basis of the first D2D resource message. Specifically, the eNB 200-2 adds a radio resource corresponding to the D2D reception resource pool set in the eNB 200-1 to the D2D reception resource pool in the eNB 200-2. Therefore, the eNB 200-1 adds the radio resource of the frequency band #1 to the D2D reception resource pool of the eNB 200-2. As a result, the eNB 200-2 sets the radio resources of the frequency bands #1 and #2 as a new D2D reception resource pool (see FIG. 9(B)).

Similarly to the eNB 200-2, the eNB 200-3 sets a new third D2D reception resource pool on the basis of the first D2D reception resource pool. Therefore, the eNB 200-3 adds the radio resource of the frequency band #1 to the D2D reception resource pool of the eNB 200-3. As a result, the eNB 200-3 sets the radio resources of the frequency band #1 and the frequency band #32 as a new D2D reception resource pool (see FIG. 9(B)).

As described above, by performing an exchange of the reception resource pools among the eNBs 200, and also setting a new reception resource pool on the basis of the exchanged reception resource pools, coordination of the D2D resources is performed.

Next, as shown in FIG. 9(B), further coordination of the D2D resources is performed among the eNBs 200.

As described above, the eNB 200-1 transmits the first D2D resource message to the eNB 200-2 and the eNB 200-3. Here, the first D2D resource message includes information on the D2D reception resource pool (the new first D2D reception resource information) that is newly set in the eNB 200-1.

As described above, the eNB 200-2 transmits the second D2D resource message to the eNB 200-1. Here, the second D2D resource message includes information on the D2D reception resource pool (the new second D2D reception resource information) that is newly set in the eNB 200-2.

As described above, the eNB 200-3 transmits the third D2D resource message to the eNB 200-1. Here, the third D2D resource message includes information on the D2D reception resource pool (the new third D2D reception resource information) that is newly set in the eNB 200-3.

Since the D2D reception resource pool set in the eNB 200-1 includes the radio resources corresponding to the D2D reception resource pool set in each of the eNB 200-2 and the eNB 200-3, the eNB 200-1 omits the setting of a new D2D reception resource pool.

On the other hand, since the D2D reception resource pool set in the eNB 200-2 does not include the radio resource corresponding to a part of the D2D reception resource pool set in the eNB 200-1 (specifically, the frequency band #3), the eNB 200-2 adds the radio resource corresponding to the frequency band #3 to the D2D reception resource pool in the eNB 200-2. As a result, the eNB 200-2 sets the radio resources of the frequency bands #1 to #3 as a new D2D reception resource pool (see FIG. 9(C)). It is noted that the newly added radio resource corresponds to the radio resource set as the D2D reception resource pool in the eNB 200-3 that is not a neighboring base station of the eNB 200-2, before coordination of the D2D resources is performed among the eNBs 200.

Further, since the D2D reception resource pool set in the eNB 200-3 does not include the radio resource corresponding to a part of the D2D reception resource pool set in the eNB 200-1 (specifically, the frequency band #2), the eNB 200-3 adds the radio resource corresponding to the frequency band #2 to the D2D reception resource pool in the eNB 200-3. As a result, the eNB 200-3 sets the radio resources of the frequency bands #1 to #3 as a new D2D reception resource pool (see FIG. 9(C)). It is noted that the newly added radio resource corresponds to the radio resource set as the D2D reception resource pool in the eNB 200-2 that is not a neighboring base station of the eNB 200-3, before coordination of the D2D resources is performed among the eNBs 200.

As described above, as a result of coordination of D2D resources among the eNBs 200, the radio resources of the frequency bands #1 to #3 are set as the D2D reception resource pool in each eNB 200.

It is noted that in order to prevent a continuous expansion of the D2D reception resource pool due to repeated coordination of the D2D resources, each eNB 200 is capable of performing methods described below.

As a first method, the eNB 200 sets a D2D reception resource pool on the basis of restriction information restricting the range of the D2D reception resource pool.

Here, the restriction information may be information for designating the maximum range of a frequency band settable as a D2D reception resource pool, or may be information for designating the maximum number of resource blocks settable as the D2D reception resource pools. Further, the restriction information may be notified from an upper network device of the eNB 200, such as an OAM, or may be set beforehand in the eNB 200.

The eNB 200 does not add, to the D2D reception resource pool in the eNB 200, a radio resource that has exceeded the range specified by the restriction information from among the radio resources corresponding to the D2D reception resource pool set in the neighboring eNB 200.

As a second method, the eNB 200 sets a D2D reception resource pool on the basis of a resource report from the UE 100.

Specifically, first of all, when receiving a D2D radio signal from another UE 100 by performing scanning on the D2D reception resource pool in the cell 250, the UE 100 that exists in the cell 250 managed by the eNB 200 transmits a resource report to the eNB 200. The resource report is a report including the information on radio resources with which a D2D radio signal has been successfully received.

When the UE 100 is in an RRC connected state, the UE 100 may transmit the resource report to the eNB 200 upon successful reception, as a trigger, of the D2D radio signal, or the UE 100 may transmit the resource report to the eNB 200 when the UE 100 transits to the RRC connected state upon successful reception of the D2D radio signal in the RRC idle state.

The eNB 200 receives, from the UE 100 that exists in a cell of the eNB 200, the resource report including the information on the radio resource with which a D2D radio signal has been successfully received. The eNB 200 saves the received resource report in the memory 230.

When setting a D2D reception resource pool, the eNB 200 deletes, from the D2D reception resource pool, the radio resource that does not correspond to the radio resource with which the D2D radio signal has been successfully received, on the basis of the saved resource report.

Alternatively, the eNB 200 updates the radio resource corresponding to the radio resource with which a D2D radio signal has been successfully received from among the radio resources included in the D2D reception resource pool, on the basis of the received resource report. The eNB 200 may delete the radio resources that are not updated in a predetermined period from among the radio resources included in the D2D reception resource pool.

As a third method, the eNBs 200 set a D2D reception resource pool on the basis of a D2D transmission resource pool.

As in the above-described first embodiment, the eNB 200 may delete, from the radio resources included in the D2D reception resource pool, a radio resource that is different from the radio resource corresponding to the D2D transmission resource pool set in a neighboring eNB 200 (and another eNB 200 that is not in the neighborhood), on the basis of the D2D transmission resource information received from a neighboring eNB 200.

It is noted that a method that is a combination of the above-described first to third methods may also be performed.

Summary of Second Embodiment

In the present embodiment, by adding a radio resource corresponding to the D2D reception resource pool that is set in the eNB 200-2 to the D2D reception resource pool in the eNB 200-1 on the basis of the second D2D resource message, the eNB 200-1 sets a new D2D reception resource pool. In addition, the eNB 200-1 transmits, to the eNB 200-2, the first D2D resource message including the new first D2D reception resource information, which is information on the new D2D reception resource pool in the eNB 200-1. Further, by adding a radio resource corresponding to the new first D2D reception resource pool to the D2D reception resource pool in the eNB 200-3 on the basis of the first D2D resource message, the eNB 200-3 is capable of setting a new D2D reception resource pool. As a result, the eNB 200-3 is capable of setting the D2D reception resource pool on the basis of the new first D2D reception resource information in which the D2D reception resource pool that is set in the eNB 200-2 is reflected, and therefore, a D2D radio signal is capable of be received between the eNB 200-2 and the eNB 200-3, while suppressing an increase in the overheads.

In the present embodiment, the eNB 200-3 is capable of setting a new D2D reception resource pool on the basis of the restriction information restricting the range of the D2D reception resource pool. As a result, it is possible to reduce the expansion of the D2D reception resource pool more than the required amount. As a result, it is possible to narrow the area that is scanned by the UE 100 to receive the D2D radio signal.

In the present embodiment, by deleting, from the reception resource pool, the radio resource that does not correspond to the radio resource with which a D2D radio signal has been successfully received, on the basis of the resource report from the UE 100, the eNB 200-3 is capable of setting a new D2D reception resource pool. This allows the radio resources not used in the reception of the D2D radio signal to be deleted, and therefore, it is possible to reduce the expansion of the D2D reception resource pool more than the required amount. As a result, it is possible to narrow the area that is scanned by the UE 100 to receive the D2D radio signal.

Other Embodiments

In each of the above-described embodiments, the eNB 200 sets a new D2D reception resource pool on the basis of the radio resources corresponding to the D2D transmission resource pool and the D2D reception resource pool in the other eNBs 200; however, this is not limiting. The eNB 200-3 may set a new D2D transmission resource pool on the basis of the radio resource. Specifically, the eNB 200 may set a new D2D transmission resource pool by adding the radio resource to the D2D transmission resource pool that is set in the eNB 200-3.

In each of the above-described embodiments, the eNB 200 manages only one cell 250; however, this is not limiting. The eNB 200 may manage a plurality of cells. In such a case, the eNB 200 may add a radio resource corresponding to the D2D transmission resource pool (and/or the D2D reception resource pool) in the other eNBs 200, to the D2D reception resource pool in each of the plurality of cells. Alternatively, the eNB 200 may add a radio resource corresponding to the D2D transmission resource pool (and/or the D2D reception resource pool) in the other eNBs 200, to the D2D reception resource pool that is set in any one of the plurality of cells.

In the second embodiment described above, the restriction information is information restricting the range of the D2D reception resource pool; however, this is not limiting. The restriction information may include information restricting the range of the D2D transmission resource pool.

In each of the above-described embodiments, each eNB 200 may belong to a different PLMN.

Each of the above-described embodiments may be combined where appropriate. For example, each D2D resource message may include information on the D2D transmission resource pool and the D2D reception resource pool. For example, the D2D resource message may include information on the D2D transmission resource pool set in the local base station, and information on the D2D reception resource pool set in a neighboring eNB. Alternatively, the D2D resource message may include information on the D2D reception resource pool set in the local base station, and information on the D2D transmission resource pool set in a neighboring eNB. Each eNB 200 is capable of performing the settings of the D2D transmission resource pool and/or the D2D reception resource pool on the basis of the information.

In each of the above-described embodiments, the information on the resource block (RB) included in the D2D resource message (the D2D resource information) may be a bit map indicating the RB (see FIG. 7), or may be information indicating the number of RBs, or may be information for designating the start offset, or may be information for designating the end offset. Further, the information on the subframe included in the D2D resource message (the D2D resource information) may be a bit map indicating a subframe (see FIG. 7), or may be information for designating the start offset, or may be information indicating the number of repetitions of a subframe.

In the second embodiment described above, in order to prevent a continuous expansion of the D2D resource pool (the D2D transmission resource pool and/or the D2D reception resource pool), the eNB 200 may set the D2D resource pool of the cell of the eNB 200 as a new D2D resource pool only when a D2D resource pool has a physical layer parameter (for example, the CP length) that is the same as the D2D resource pool of the cell of the eNB 200. On the other hand, the eNB 200 may not set a D2D resource pool that has a different physical layer parameter (for example, the CP length) than the D2D resource pool of the cell of the eNB 200 as a new D2D resource pool, and may perform separate management.

In each of the above-described embodiments, although the LTE system is described as an example of the mobile communication system, the embodiment is not limited to the LTE system, and the present invention may be applied to a system other than the LTE system.

It is noted that the present invention may be applied regardless of whether or not two eNBs that have established a connection via an X2 interface are related as neighboring eNBs. Further, the transfer of information on a D2D resource does not depend on the connection state of the transfer-destination eNB via the X2 interface. That is, regardless of whether or not the eNB that is the transmission source of the information on the D2D resource, and the eNB that is the transfer destination for transferring the information on the D2D resource have established a connection via the X2 interface, the eNB 200 is capable of transferring the information on the D2D resource.

Specifically, when each of the eNB 200A, the eNB 200B, and the eNB 200C are related to each other as neighboring eNBs, or have established a connection with each other via the X2 interface, the eNB 200A may transmit, to the eNB 200C, the information on the D2D resource that is set in the eNB 200B. For example, the eNB 200A is capable of transmitting, to the eNB 200C, the information on the D2D resource that is set in the eNB 200B without confirming whether or not a connection has been established between the eNB 200B and the eNB 200C via the X2 interface. Alternatively, when it is not temporarily possible to establish the connection between the eNB 200B and the eNB 200C via the X2 interface, the eNB 200A may transmit the information to the eNB 200C rather than the eNB 200B.

It is noted that the entire content of Japanese Patent Application No. 2014-059279 (filed on Mar. 20, 2014) is incorporated in the present specification by reference.

INDUSTRIAL APPLICABILITY

As described above, according to the communication control method and the base station of the present embodiment, it is possible to receive a radio signal for a D2D proximity service between user terminals that are not in the neighborhood but exist in different cells, while suppressing an increase in overheads, and as a result, the present invention is useful in the field of mobile communication.

The invention claimed is:

1. A communication control method used in a mobile communication system that supports a D2D proximity service including D2D communication that is direct device-to-device communication, comprising:
 a step of receiving, by a first base station, a second resource message from a third base station that is a neighboring base station of the first base station; and
 a step of transmitting, by the first base station, to a second base station that is a neighboring base station of the first base station and different from the third base station, a first resource message, wherein
 the second resource message includes information indicating a second D2D transmission resource available for transmission of a D2D radio signal in the third base station and information indicating a fourth D2D transmission resource available for transmission of a D2D radio signal in a fourth base station that is not a neighboring base station of the first base station but is a neighboring base station of a third base station, the first resource message includes information indicating a first D2D transmission resource available for transmission of a D2D radio signal in the first base station, information indicating the second D2D transmission resource and information indicating the fourth D2D transmission resource.

2. The communication control method according to claim 1, wherein
the communication control method further comprises:
a step of setting, by the second base station, a new third D2D reception resource by adding a radio resource corresponding to the first D2D transmission resource and the second D2D transmission resource to a third D2D reception resource available for reception of a D2D radio signal in the second base station, on the basis of the first resource message.

3. The communication control method according to claim 1, wherein in the step of transmitting the first resource message, when the second D2D transmission resource is within a range of the first D2D transmission resource, the first base station transmits the first resource message that includes information indicating the first D2D transmission resource, and does not include information indicating the second D2D transmission resource.

4. The communication control method according to claim 1, wherein in the step of transmitting the first resource message, when the fourth D2D transmission resource is within a range of the second D2D transmission resource, the first base station transmits the first resource message that includes information indicating the second D2D transmission resource, and does not include information indicating the fourth D2D transmission resource.

5. A communication control method used in a mobile communication system that supports a D2D proximity service including D2D communication that is direct device-to-device communication, comprising:
a step of receiving, by a first base station, a second resource message from a third base station that is a neighboring base station of the first base station; and
a step of transmitting, by the first base station, to a second base station that is a neighboring base station of the first base station and different from the third base station, a first resource message, wherein
the second resource message includes information indicating a second D2D transmission resource available for transmission of a D2D radio signal in the third base station and information indicating a fifth D2D transmission resource available for transmission of a D2D radio signal in a fifth base station that is not a neighboring base station of the first base station,
the first resource message includes information indicating a first D2D transmission resource available for transmission of a D2D radio signal in the first base station, information indicating the second D2D transmission resource and information indicating the fifth D2D transmission resource, and
the communication control method further comprises:
a step of setting, by the second base station, a new third D2D reception resource by adding a radio resource corresponding to the fifth D2D transmission resource to a third D2D reception resource available for the reception of a D2D radio signal in the second base station, only when a hop count of information indicating the fifth D2D transmission resource is equal to or below an upper-limit value.

6. The communication control method according to claim 1, wherein the second resource message further includes information indicating a second D2D reception resource available for reception of a D2D radio signal in the third base station,
the communication control method further comprises:
a step of setting, by the first base station, a new first D2D reception resource by adding a radio resource corresponding to the second D2D reception resource to a first D2D reception resource available for reception of a D2D radio signal in the first base station, on the basis of the second resource message, and
the first resource message further includes information indicating the new first D2D reception resource.

7. The communication control method according to claim 6, further comprising: a step of setting, by the second base station, a new third D2D reception resource by adding a radio resource corresponding to the new first D2D reception resource to a third D2D reception resource available for reception of a D2D radio signal in the second base station, on the basis of the first resource message.

8. The communication control method according to claim 7, wherein
in the step of setting the third D2D reception resource, the second base station sets the new third D2D reception resource on the basis of restriction information restricting a range of the third D2D reception resource.

9. The communication control method according to claim 6, further comprising: a step of receiving, by the second base station, from a user terminal that exists in a cell of the second base station, a resource report including information on a radio resource with which a D2D radio signal has been successfully received, and
in the step of setting the new third D2D reception resource, by deleting, from the third D2D reception resource, a radio resource that does not correspond to the radio resource with which a D2D radio signal has been successfully received, on the basis of the resource report, the second base station sets the new third D2D reception resource.

10. The communication control method according to claim 1, wherein the first resource message further includes information indicating a second D2D reception resource available for the reception of a D2D radio signal in the third base station.

11. The communication control method according to claim 1, wherein the first resource message further includes information indicating a first D2D reception resource available for reception of a D2D radio signal in the first base station.

12. A first base station used in a mobile communication system that supports a D2D proximity service including D2D communication that is direct device-to-device communication, comprising:
a receiver configured to receive a second resource message from a third base station that is a neighboring base station of the first base station;
a transmitter configured to transmit, to a second base station that is a neighboring base station of the first base station and different from the third base station, a first resource message, wherein
the second resource message includes information indicating a second D2D transmission resource available for transmission of a D2D radio signal in the third base station and information indicating a fourth D2D transmission resource available for transmission of a D2D radio signal in a fourth base station that is not a neighboring base station of the first base station but is a neighboring base station of a third base station, the first resource message includes information indicating a first D2D transmission resource available for transmission of a D2D radio signal in the first base station, information indicating the second D2D transmission resource and information indicating the fourth D2D transmission resource.

* * * * *